Figure 1:
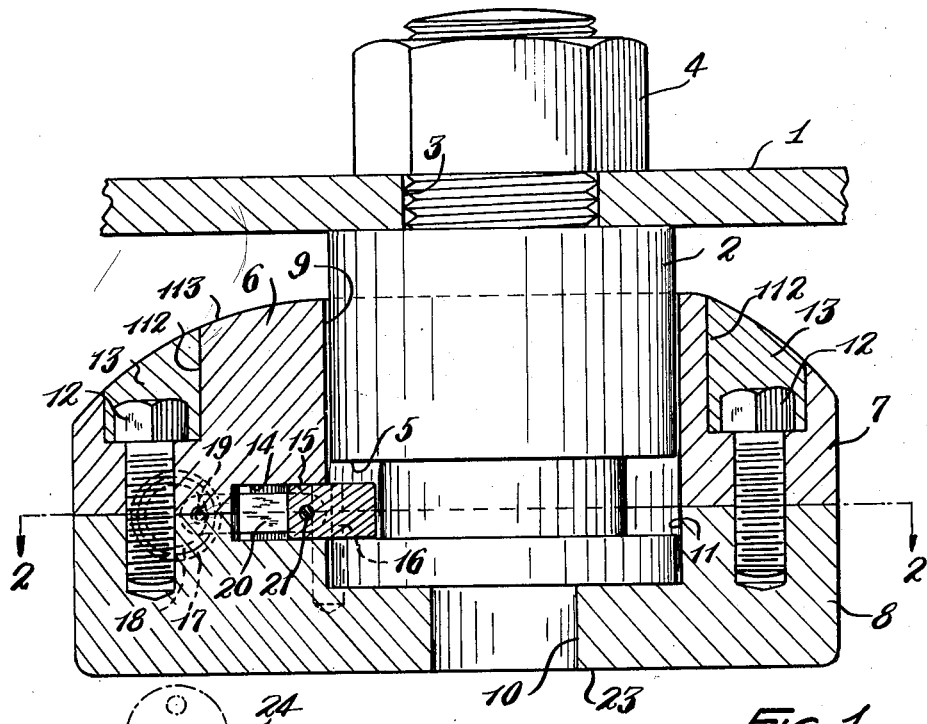

April 19, 1955 G. L. LUCAS ET AL 2,706,392
LOCK COLLAR FOR A TRAILER KINGPIN
Filed Nov. 14, 1952

INVENTORS
Guy L. Lucas
William D. Edwards
BY Ralph S. Chaffin

Oldham & Oldham
Attorneys

United States Patent Office 2,706,392
Patented Apr. 19, 1955

2,706,392

LOCK COLLAR FOR A TRAILER KINGPIN

Guy L. Lucas, William D. Edwards, and Ralph S. Chaffin, Akron, Ohio, assignors to Trail Lock Corporation, Akron, Ohio, a corporation of Ohio Application November 14, 1952, Serial No. 320,446

5 Claims. (Cl. 70—232)

This invention relates to lock collars, and more particularly, to lock collars which fit onto the kingpin or similar member of a conventional freight trailer to prevent such kingpin from being positioned in unauthorized engagement with the jaws of a fifth wheel or other engaging means of a tractor, such as would be used in moving the trailer.

This invention relates to our previous copending application Serial No. 225,204, now Patent No. 2,656,706, issued October 27, 1953, upon a Lock Collar for a Trailer Kingpin and is an improvement thereover in that a different type of construction is provided by the present invention from the structure shown in such prior application.

As previously indicated, the coupling between freight pulling tractors and trailers has been standardized so that any tractor can be coupled to any trailer throughout the trucking industry today and these couplings include the use of a so-called fifth wheel mounted on a tractor which engages with a kingpin extending downwardly from the frame of the trailer to couple the trailer to the tractor to be moved thereby. The kingpins normally have a recess therein to aid in coupling the kingpin to a tractor. As is well known, trailers are frequently parked or stored at isolated spots, or a great number of trailers may be temporarily stored in any of a number of places where the owner of the trailer may not be able to watch them. Thus it becomes necessary to take some type of preventive action to prevent unauthorized use or theft of trailers and the lock collars of the invention are especially designed for such purpose.

It is the general object of our invention to provide a novel lock collar for a trailer kingpin which lock collar is characterized by its generally tubular construction and by the minimum of movable parts provided in the lock collar.

Another object of the invention is to provide a lock collar which is of uncomplicated but sturdy construction and which can be inexpensively manufactured.

A further object of the invention is to provide a lock collar which can be tightly engaged with a kingpin of a trailer to be secured thereto against relative axial movement between the kingpin and the lock collar.

Yet a further object of the invention is to utilize a conventional tumbler lock in a lock collar of the type described and to take thrust or load applied to the lock collar on a lock member separate from the operative lock mechanism of the collar.

Another object of the invention is to provide a lock collar which is made from a pair of cast metal parts permanently secured together to provide a lock collar having a minimum of exposed movable parts.

The foregoing and other objects of the invention will be made more apparent as the specification proceeds.

Figure 2:
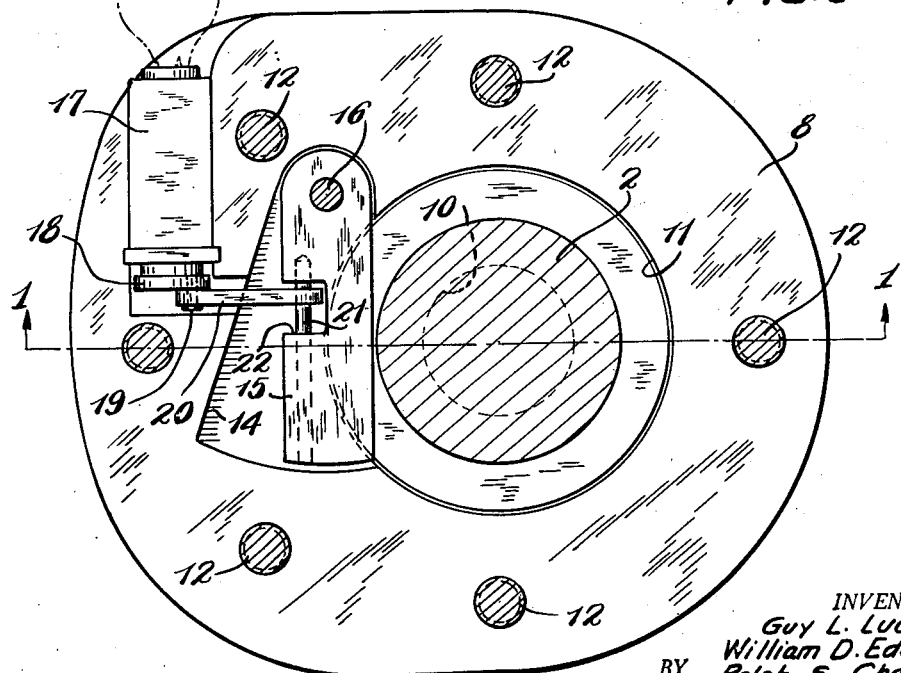

For a better understanding of the invention, reference should be had to the accompanying drawings, wherein:

Fig. 1 is a vertical section of a lock collar embodying the principles of the invention, which section is taken on line 1—1 of Fig. 2; and Fig 2 is a horizontal section of the lock collar taken on line 2—2 of Fig. 1.

The lock collar of the invention broadly comprises a two-section circumferentially split tubular member having a bore for engaging a trailer kingpin, or the like. This tubular member may have one partially closed end for abutting the outer end of a kingpin when the lock collar is engaged therewith, and means are provided for securing the sections of the tubular member permanently together. A lock arm is received in an aperture provided in the tubular member, means pivotally position such lock arm for movement into the bore of the tubular member to engage a recess in a kingpin, and lock means are provided for controlling the lock arm and securing it in a desired position.

In Fig. 1 of the drawings, an anchor plate 1 is provided which normally would be a portion of the frame of a conventional freight trailer as used in the trucking industry, or else a bracket, or plate secured to the trailer frame. This anchor plate 1 is shown as provided with a kingpin 2 extending downwardly therefrom, with a threaded portion of the kingpin extending through a hole 3 in the anchor plate 1 and being secured to such anchor plate by means of a nut 4 which engages a protruding threaded end of the pin. These kingpins 2 are of conventional construction and normally include a recess 5 extending circumferentially of the kingpin 2 spaced slightly from the lower end of such kingpin but normally extending therearound.

As an important feature of the present invention, the lock collar of the invention primarily comprises a tubular member 6 that normally is made from two sections 7 and 8 each of which is of generally annular shape. These sections 7 and 8 of the tubular member 6 usually are made from metal by a casting operation and may be finished in any conventional manner, as required. The section 7 of the tubular member 6 has a bore 9 extending therethrough, whereas an appreciably smaller bore 10 is formed in the section 8 and it may be counterbored as at 11, at one end thereof, with the counterbore 11 being of the same diameter as the bore 9 and smoothly forming an extension thereon. The kingpin 2 engages with the bore 9 and counterbore 11 and normally the lower end of the kingpin 2 will contact the shoulder defining the counterbore 11, as explained hereinafter in more detail. The sections 7 and 8 of the tubular member 6 may be secured together in any conventional manner, but the use of cap screws 12 for securing such sections together is preferred, as being a convenient, inexpensive method of assembling such sections. The heads of the cap screws 12 are positioned in recesses 112 provided in the axially inner surface or end of the section 7. Fig. 1 shows that the axially inner surface 113 of the section 7 is of arcuate or rounded construction as this aids in preventing anyone from engaging a lever or prying bar with such surface. In order to render the lock collar of the invention of permanent construction, some type of metal, such as lead, is poured or cast around the heads of the cap screws 12 to fill the recesses 112, as indicated at 13, so that such metal completely covers all exposed surfaces of the means used to secure the sections 7 and 8 together and prevent disassembly of the lock collar.

As shown in the drawings, the tubular member 6 has a cavity 14 provided therein adjacent the wall of the bore 9 and connecting thereto. A lock arm 15 is snugly received in such cavity 14 and confined against movement axially of the bore of the collar and pivotal movement of the lock arm 15 radially of the bore is permitted about a suitable pin 16 used to secure the lock arm 15 in pivotal relation to the tubular member 6.

As an important feature of the invention, the position of the lock arm 15 is controlled by means of a conventional tumbler type lock 17 which has a control plate 18 positioned at one end thereof and which may be called part of the tumbler of the lock. This control plate 18 has a pin 19 extending therefrom in eccentric relationship to the axis of the lock 17. Thus, a link 20 can be connected between the pin 19 and a member, such as a pin 21, that is fixedly secured to the lock arm 15 and extends across a recess 22 therein so that the control link 20 can extend thereinto. The tumbler type lock is located in a recess between the bodies 7 and 8 and having a bore whose axis is in the parting plane of the bodies and extends substantially parallel to the lock arm 15 and the bore has an enlarged confining groove for securing a retaining shoulder of the lock. Thus, locking or unlocking the lock 17 moves the control plate 18 through an arc whereby the link 20 and lock arm 17 are swung from operative to inoperative position, or vice versa, as desired.

The operative or locked position of the lock arm 15 exists when such lock arm protrudes into the recess 5 provided in the kingpin 2. Fig. 1 of the drawing best shows that the lower surface of the lock arm 15 tightly engages the lower surface of the recess 5 to cooperate with a closed end portion 23 on the section 8 of the tubular member 6 in order to position the lock collar of the invention in fixed relation to the kingpin 2 with regard to axial movement therebetween. In some instances, it may be desirable to omit the bore 10 and leave the end 23 completely closed.

It will be seen that a minimum of operative or movable parts are provided in the lock collar of the invention and that such operative parts are received in a sturdy tubular member which could not be easily tampered with or destroyed. The lock arm 15 is of sturdy construction and is reinforced by engaging the walls of the recess 14 even when in an extended position, which aids in preventing any unauthorized movement of the lock collar.

A key is indicated at 24 to show how it would be engaged with the lock 17 for controlling the position of the lock arm 15.

From the foregoing, it is thought apparent that a sturdy lock collar of desirable construction has been provided by the invention and that the objects of the invention have been achieved.

While one complete embodiment of the invention has been disclosed herein, it will be appreciated that modifications of this particular embodiment of the invention may be resorted to without departing from the scope of the invention as defined by the appended claims.

Having thus described our invention, what we claim is:

1. A lock collar for a trailer kingpin or the like, which lock collar comprises a two part circumferentially split tubular member having a bore for engaging a kingpin, said member having an at least partially closed end for abutting the outer end of a kingpin when the lock collar is engaged therewith, cap screws securing the sections of said tubular member together, cast metal means surrounding all exposed portions of said cap screws and embedding them therein for permanent positioning of said cap screws, a lock arm in a recess between the two parts of the tubular member, means pivotally positioning said lock arm on said tubular member for movement into the bore radially thereof, a lock having a rotatable tumbler therein carried by said tubular member with its axis chordwise thereof and substantially parallel to said lock arm, and a link pivotally connecting said tumbler to said lock arm for controlling the position thereof and locking said lock arm in a position extending into the bore of said tubular member.

2. A lock collar for a trailer kingpin or the like, which lock collar comprises a two-section circumferentially split tubular member having a bore for telescopic engagement with a kingpin, said member having an at least partially closed end for abutting the outer end of a kingpin when the lock collar is engaged therewith, means for permanently securing the sections of said member together, a lock arm, means pivotally positioning said lock arm within said member movable into the bore radially thereof for engaging a kingpin, and rotatable tumbler lock means positioned in said member with its axis substantially parallel to said lock arm and connected to said second-named means for controlling the position of said lock arm and securing it in a position extending into the bore of said member.

3. A lock collar for a trailer kingpin or the like, which lock collar comprises a two-section circumferentially split tubular member having a bore for engaging a kingpin, said tubular member having an at least partially closed end for abutting the outer end of a kingpin when the lock collar is engaged therewith, means for securing the sections of said tubular member together, a lock arm, means pivotally positioning said lock arm on said tubular member movable into the bore thereof for engaging a kingpin, and lock means located in a recess between the sections of said collar and interlocked with said sections for controlling the position of said lock arm.

4. A lock collar for a trailer kingpin or the like, said collar comprising two bodies of metal defining a bore extending through one of said bodies and into the other body across parting surfaces of said bodies to receive a kingpin, means for securing said bodies to each other, said means comprising screws passing through one body and engaging blind threaded holes in the other, said screws having heads countersunk below the outer surface of said one body, a recess defined between said bodies at their parting surfaces and open to said bore in alignment with an annular groove of a kingpin entered therein, a lock arm confined in said recess in a direction axial of said bore and movable in a plane radial of said bore in said recess from a position clearing said bore to a position intersecting said bore chordwise thereof to enter the annular groove of the kingpin, said lock arm being pivotally mounted for such movement about a pin secured to at least one of said bodies, a second recess defined between said bodies and connecting with the first said recess, said second recess including a bore chordwise of said collar and having its axis substantially parallel to the chordwise locking position of said lock arm, said bore of the second named recess including a confining groove of increased bore, a tumbler type lock confined within said second recess between said bodies and having a retaining shoulder confined by said last-named groove to prevent removal of said lock when said bodies are screwed to each other, a link pivotally connected between said lock and said lock arm for pivotally moving said lock arm upon rotation of the tumbler of said lock, said tumbler having an eccentric pivotal connection to said link, and means covering the countersunk head of the screws securing said bodies to each other within the confines of said body to prevent removal of said screws.

5. A lock collar as defined by claim 4 in which the last named means is a fusible metal filling within the countersunk openings about the heads of the screws.

References Cited in the file of this patent

UNITED STATES PATENTS

| 1,683,932 | Summers | Sept. 11, 1928 |
| 1,764,367 | Szymanski | June 17, 1930 |
| 2,124,035 | Hurd | July 19, 1938 |
| 2,554,306 | Mack | May 22, 1951 |